April 30, 1946.     L. M. LEWISON     2,399,364

TRACTOR HITCH

Filed July 2, 1945

INVENTOR.
L. M. Lewison
BY
C. A. Snowles
ATTORNEYS.

Patented Apr. 30, 1946

2,399,364

UNITED STATES PATENT OFFICE 2,399,364

TRACTOR HITCH

Lawrence M. Lewison, Sioux Rapids, Iowa

Application July 2, 1945, Serial No. 602,768

5 Claims. (Cl. 280—33.15)

This invention relates to tractor hitches, the primary object of the invention being to provide a tractor hitch which may be readily and easily operated by the operator of the tractor while seated on the tractor seat, thereby eliminating the necessity of the operator climbing on and off the tractor to hitch wagons or farm machinery to the towing tractor.

An important object of the invention is to provide a tractor hitch of this characer including a sliding bolt which is automatically moved to its locking position, when the tongue iron of the vehicle or machine to be towed is moved to engage the draw-pin of the hitch.

Still another object of the invention is to provide means controlled from the operator's seat, for actuating the sliding bolt to release the vehicle or machine towed, means being also provided for automatically securing the sliding bolt in its inactive position.

With the foregoing and other objects in view which will appear as the description proceeds, the invention consists of certain novel details of construction and combinations of parts hereinafter more fully described and pointed out in the claims, it being understood that changes may be made in the construction and arrangement of parts without departing from the spirit of the invention as claimed.

Referring to the drawing.

Figure 1:
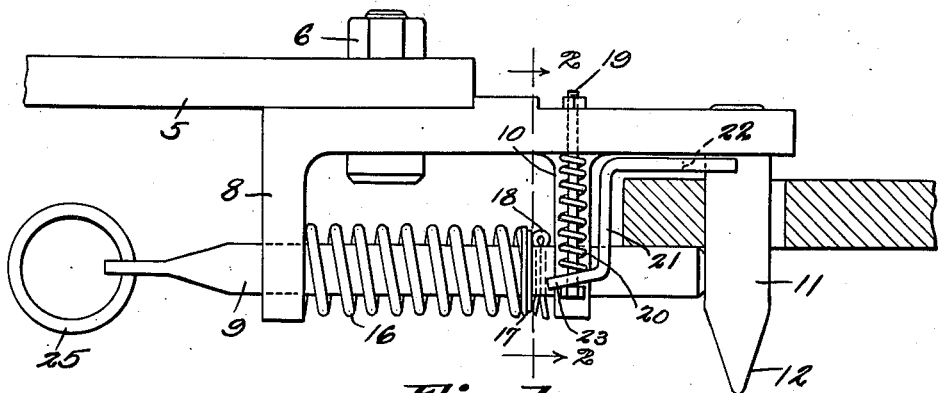
Figure 1 is a side elevational view of the tractor hitch illustrating the hitch as connected with the tongue iron of a wagon or machine.

Referring to the drawing in detail, the reference character 5 designates the draw-bar of a tractor to which the tractor hitch forming the subject matter of the present invention, is secured, as by means of the bolt 6 which is shown as passing through the draw-bar and body portion of the hitch.

The body portion of the hitch comprises a wide bar 7 having a downwardly extended arm 8 formed at one end thereof, the arm 8 being formed with an opening to receive the sliding pin 9.

Arranged in spaced relation with the arm 8, is a depending arm 10 which is also formed with an opening to receive the forward end of the sliding pin or bolt 9. The sliding pin 9 is of a length to normally extend an appreciable distance beyond the arm 10 where it contacts with the pin 11 that extends downwardly from the forward end of the body portion. The free end of the pin 11 is tapered as at 12 so that it will readily find its way into the opening 13 of the tongue iron 14 which is secured to the tongue 15 of the wagon or machine to be connected by the hitch to the tractor.

Mounted on the sliding pin 9, is a coiled spring 16 that has one of its ends bearing against the arm 8, the opposite end thereof being secured against movement longitudinally of the sliding pin 9 by means of the washer 17 and cotter key 18, the cotter key being shown as extending through an opening formed in the sliding pin 9. The spring 16 is of the expansible type and acts to normally urge the sliding pin 9 to its active position as shown by Fig. 1 of the drawing.

Arranged at opposite side edges of the arm 10, are bolts 19 that extend through the body portion or bar 7, and extend an appreciable distance below the body portion, where they provide supports for the coiled springs 20.

Figures 2, 3:
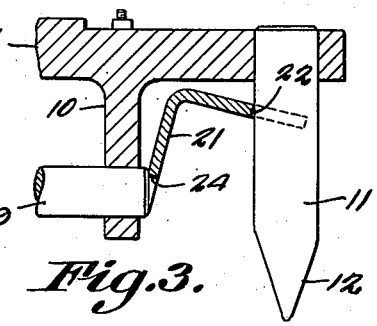
Figure 2 is a sectional view taken on line 2—2 of Fig. 1.
Figure 3 is a sectional view taken on line 3—3 of Fig. 2.
Figures 4, 5:
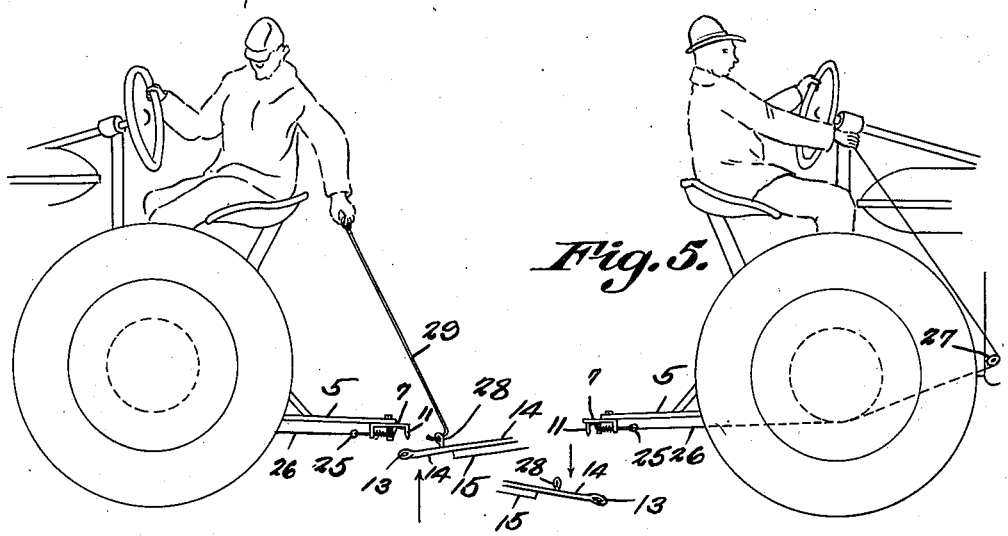
Figure 4 is a view illustrating the operator of a tractor as using the lifting hook in lifting the tongue iron into position for engagement with the hitch.
Figure 5 is a view illustrating the operator of the tractor as operating the hitch to release the wagon or machine towed.

The reference character 21 indicates a trigger which is in the form of a plate constructed to provide right-angled portions one of which is provided with a curved notch extending inwardly from the outer edge thereof, the notch being indicated by the reference character 22. This notch is adapted to receive the pin 11 when the latch moves forwardly to lock the sliding pin 9 in its inactive position, as shown by Fig. 3 of the drawing. This trigger is also formed with a rectangular cut-out portion and rearwardly extended fingers 23 which are formed with openings to accommodate the bolts 19 between the heads of the bolts and coiled springs 20. Thus it will be seen that the action of these springs 20 is to normally exert downward pressure on the latch member to tilt the latch member forwardly, to the position as shown by Fig. 3. Due to the construction of the latch member, the cut-out portion formed at the lower end thereof is such as to provide a shoulder 24 that is adapted to fall in the path of travel of the pin 9 to its active position.

An operating ring 25 is secured to one end of the sliding pin 9 and provides means to which the operating cable 26 is connected to the sliding pin, the cable 26 also operating over the pulley 27 secured to the tractor, while the operating end of the cable is secured at a point adjacent to the operator's seat, where the operator will have easy access thereto, to move the sliding pin to release the wagon tongue, connected by the hitch.

Extending upwardly from the tongue iron 14 is an eye bolt 28 that is adapted to be engaged by the hooked end of the lifting hook 29 which is carried on the tractor for ready use by the operator. When it is necessary to connect a wagon tongue to the tractor, it is only necessary for the operator to back the tractor to a position directly over the tongue and tongue iron of the wagon or machine to be hitched. The operator now lifts the tongue iron to a position so that the pin 11 moves into the opening of the tongue iron. As the tongue iron moves upwardly over the pin 11, it strikes the trigger 21 moving the trigger upwardly out of contact with the sliding pin 9. The coiled spring 16 will now operate to urge the sliding pin 9 to a position into engagement with the pin 11, securely locking the tongue iron to the hitch.

From the foregoing it will be seen that due to the construction shown and described, the operator of a tractor may, while seated on the operator's seat of the tractor, manipulate the tractor hitch to release the tongue of the wagon or machine being towed. The operator may also, while seated on the operator's seat, lift the tongue iron of the wagon or machine to be hitched to the tractor, by means of the lifting hook, thereby eliminating the necessity of the operator climbing on and off of the tractor and running the risk of injury due to his position between the tractor and wagon or machine, while the tractor is being backed in position to be hitched.

What is claimed is:

1. In a tractor hitch, a body portion adapted to be bolted to the draw-bar of a tractor, spaced depending arms formed on the body portion, said arms having aligning openings, a spring-pressed sliding bolt operating in the openings, a draw pin having a tapered end extending downwardly from the body portion and adapted to extend into the opening of a wagon tongue iron, a trigger mounted between the draw pin and end of the sliding bolt, said trigger adapted to overlie one end of the bolt and restrict sliding movement of the bolt in one direction, and said trigger adapted to move upwardly by contact with the trailer tongue iron hitched to the tractor, releasing the sliding bolt, and said bolt adapted to move into engagement with the draw pin below the tongue iron, securing the draw-bar to the draw pin.

2. In a tractor hitch, a body portion adapted to be bolted to the draw-bar of a tractor, a draw pin depending from the body portion, a spring-pressed sliding bolt adapted to move into engagement with said draw-pin, a tongue iron having an opening adapted to accommodate the draw pin, a trigger pivotally mounted between the sliding bolt and draw pin, and adapted to restrict movement of said bolt in one direction, and said trigger adapted to move to release the sliding bolt by contact of the tongue iron with the trigger, when the tongue iron is positioned to receive the draw pin.

3. In a tractor hitch, a body portion adapted to be bolted to the draw-bar of a tractor, a tapered draw pin depending from the body portion, a sliding bolt mounted on the body portion and adapted to move into contact with the draw pin, a trigger pivotally mounted between the draw pin and sliding bolt, and adapted to normally lie in the path of travel of the sliding bolt, restricting movement of said sliding bolt, and said trigger adapted to be moved upwardly by contact with a tongue iron positioned over the draw-pin, releasing the sliding bolt, and said sliding bolt adapted to be moved to a position in contact with the draw pin below the tongue iron, securing the tongue iron to said pin.

4. A tractor hitch comprising in combination, a tongue iron having an opening, a body portion embodying a draw-pin extending from the body portion, said draw-pin adapted to be positioned in the opening of the tongue iron, a sliding bolt mounted on the body portion, said sliding bolt adapted to move into engagement with the draw-pin, securing the tongue iron to the body portion, a trigger adapted to normally hold the sliding bolt in its inactive position, and said trigger adapted to move to release the sliding bolt to its active position, by contact with the tongue iron moving over the pin.

5. A tractor hitch comprising in combination, a tongue iron having an opening, a body portion, a draw-pin extending from the body portion and adapted to be positioned in the opening of the tongue iron, a sliding spring-pressed bolt mounted on the body portion, said bolt adapted to move into engagement with the draw-pin below the tongue iron, securing the tongue iron to the draw-pin, and a trigger mounted on the body portion and adapted to be engaged by the tongue iron, releasing the sliding bolt for movement to its active position.

LAWRENCE M. LEWISON.